A. GREEN

May 10, 1927. ADJUSTING VALVE AND METHOD OF MAKING THE SAME Re. 16,617

Filed Nov. 5, 1923

INVENTOR.
ANDREW GREEN,
BY HIS ATTORNEY.
James F. Williamson

Reissued May 10, 1927. Re. 16,617

UNITED STATES PATENT OFFICE.

ANDREW GREEN, OF ALBERT LEA, MINNESOTA, ASSIGNOR TO AMERICAN GAS MACHINE COMPANY, INC., OF ALBERT LEA, MINNESOTA, A CORPORATION OF MINNESOTA.

ADJUSTING VALVE AND METHOD OF MAKING THE SAME

Original No. 1,613,323, dated January 4, 1927, Serial No. 672,857, filed November 5, 1923. Application for reissue filed March 25, 1927. Serial No. 178,492.

This invention relates to a valve and conduit for conducting fluid, and while the invention is capable of many applications, it is particularly designed and illustrated for use in connection with a gas or liquid fuel burning stove. In such stoves it has been the practice to use a long conduit or tube for conducting the fluid, either liquid or gaseous, at the end of which tube was formed a valve. This valve necessitated having a bore of much smaller diameter in the conduit than the diameter of the greater portion of the length thereof. It is impracticable and impossible as an economical commercial proposition to use one piece and to bore the same for a larger diameter for the entire length of the tube. The reduced diameter was obtained at one time by driving a brass plug into the end of the tube. This structure, however, proved objectionable as the heating of the conduit invariably caused leaks about the plug. It was later proposed to use a steel plug and to braze the same to the tube. The use of the steel plug has also proven objectionable whether driven into the tube or brazed thereto as in the use of the device and in the heating and cooling thereof leaks would occur about the plug. The present invention was then made to overcome the difficulty encountered in the use of different kinds of plugs inserted into the tube or conduit.

It is an object of this invention, therefore, to provide such a conduit and valve in which the plug is formed of a separate piece of material and after being finished, is butt-welded onto the tube.

It is more specially an object of the invention, therefore, to provide such a method in which a separate iron or steel plug is formed bored with a comparatively small diameter and a slightly larger diameter to form a valve seat and after being finished is butt-welded onto the end of the conduit which has much thinner walls.

These and other objects and advantages of the invention will be fully set forth in the following description made in connection with the accompanying drawings in which like reference characters refer to the same parts throughout the different views, and in which, Fig. 1 is a view in side elevation of a portion of the above valve structure in which the invention is used, the device being broken away to show the same;

Figure 1:
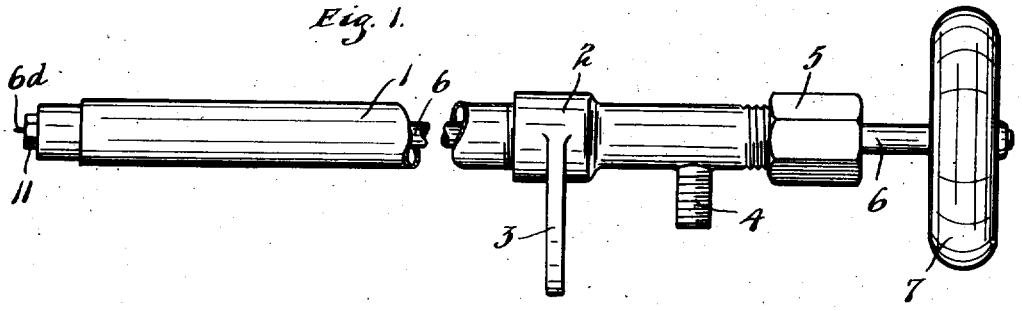
Figure 2:
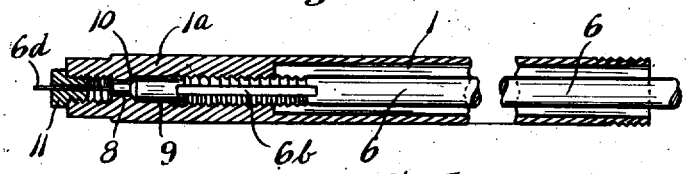
Fig. 2 is a vertical longitudinal section through a portion of the device shown in Fig. 1, also being broken away to show the length thereof.
Figure 3:
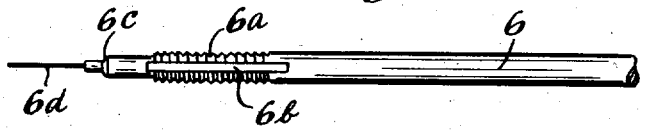
Fig. 3 is a view in side elevation of the movable portion of the valve.

Referring to the drawings, a valve structure used in connection with the stove is illustrated comprising a long tube or conduit 1 having one end connected to a hollow coupling bracket 2 having a supporting lug 3 and a threaded nozzle 4 depending therefrom, the fluid or gaseous medium being supplied through the nozzle 4 into the bracket 2 and tube 1. The bracket 2 has a packing nut 5 thereon and a stem 6 projecting through the parts 1, 2 and 5 and is equipped with an operating hand wheel 7 at one end thereof. The tube 1 has, at its other end a portion $1^a$ of smaller diameter which comprises a bore of comparatively small diameter 8 and a bore of larger diameter 9, the valve seat 10 being formed at the junction of said bores. The outer end of portion $1^a$ is tapped to receive a nozzle plug 11 and the inner end thereof is also tapped or threaded to receive the threaded portion $6^a$ adjacent the end of stem 6. A longitudinal groove $6^b$ is formed throughout the threaded portion $6^a$ so that the fluid can pass through said portion. The stem 6 is also formed at the outer end of the threaded portion $6^a$ with portions of different diameters forming a valve $6^c$ and a pin $6^d$ is formed on the outer end of the stem 6, which pin projects through the opening in the nozzle plug 11, as shown in Fig. 2.

The operation of the structure will be apparent. The fluid passes through the tube 1 through the longitudinal groove $6^b$, through the bores 8 and 9 when the valve $6^c$ is opened and then out through the nozzle 11. It is thus seen that it is necessary to have the portion $1^a$ of a much less interior diameter than the portion 1.

Figure 4:
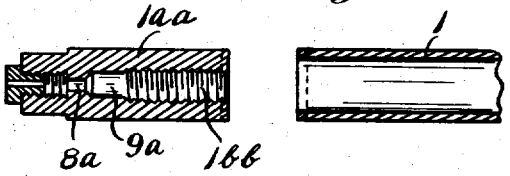
Fig. 4 is a view in vertical section of the finished plug and end of the conduit before the same are welded together.

In order successfully to construct the device and also economically to construct the same in accordance with the present invention, a cylindrical plug is formed which is designated as $1^{aa}$, in Fig. 4. This plug is bored with the bores $8^a$ and $9^a$ and provided with tapped or threaded portions $1^{bb}$ as well as with a tapped portion at its other end which is adapted to receive the nozzle plug 11. After the plug $1^{aa}$ has been finished, the same is butt-welded onto the end of the tube 1. While various methods of welding may be used, the parts, preferably, are electrically welded. The tube 1 and the plug $1^{aa}$ are brought together with their axes in alinement and the same are then heated by the welding current and the two parts thus securely and permanently joined as one integral piece. When the parts are so welded, the device already described comprising the parts 1 and $1^a$ is formed. Both the plug and the tube are of iron or steel so that an integral and homogeneous structure is formed. This structure successfully endures the heating and cooling to which the same is subjected without any leaks or cracks being formed therein.

From the above description it is seen that applicant has invented a simple and efficient method of forming such a conduit and valve structure. The invention has been amply demonstrated in actual practice and found to be very successful and efficient. The same overcomes a difficulty which has been encountered through a long period.

It will, of course, be understood, that various changes may be made in the steps of the process and the sequence thereof without departing from the scope of applicant's invention, which, generally stated, consists in a device and method capable of carrying out the objects above stated, such as shown and described and defined in the appended claims:

What is claimed is:

1. A combined vaporizing tube and valve for a liquid hydrocarbon stove, comprising a comparatively long piece of tubing, a solid cylindrical plug of much shorter length, having a bore therein, which bore forms a valve seat therein, said plug having a small bore extending from said valve seat, said first mentioned bore being of considerably smaller diameter than the internal diameter of said tube, said tube being butt-welded to the end of said plug having said first mentioned bore therein, thus forming an integral conduit having a bore throughout the length thereof, and a valve stem adapted to extend through said tube and having a valve thereon co-operating with said valve seat.

2. The method of making a combined vaporizing tube and valve for a liquid hydrocarbon stove which consists in providing a comparatively long piece of tubing, forming a solid cylindrical plug of much shorter length, forming a bore in said plug and forming a valve seat therein and forming a small bore extending from said valve seat, said first mentioned bore being of considerably smaller diameter than the internal diameter of said tube and then butt-welding one end of said tube and the end of said plug having the first mentioned bore therein together so as to leave the bores therein unobstructed, thus forming an integral conduit having a bore throughout the length thereof, and providing a valve stem adapted to extend through said conduit and having a valve thereon co-operating with said valve seat.

3. A combined vaporizing tube and valve for a liquid hydrocarbon stove, comprising a comparatively long piece of tubing, a solid cylindrical plug of much shorter length, having a bore therein, which bore forms a valve seat therein, said plug having a small bore extending from said valve seat, said first mentioned bore being of smaller diameter than the internal diameter of said tube, said tube being welded to the end of said plug having said first mentioned bore therein, thus forming an integral conduit having a bore throughout the length thereof, and a valve stem adapted to extend through said tube and having a valve thereon co-operating with said valve seat.

4. The method of making a combined vaporizing tube and valve for a liquid hydrocarbon stove which consists in providing a comparatively long piece of tubing, forming a solid cylindrical plug of much shorter length, forming a bore in said plug and forming a valve seat therein and forming a small bore extending from said valve seat, said first mentioned bore being of smaller diameter than the internal diameter of said tube and then welding one end of said tube and the end of said plug having the first mentioned bore therein together so as to leave the bores therein unobstructed, thus forming an integral conduit having a bore throughout the length thereof, and providing a valve stem adapted to extend through said conduit and having a valve thereon co-operating with said valve seat.

In testimony whereof I affix my signature.

ANDREW GREEN.